United States Patent
Roberts et al.

(10) Patent No.: US 8,081,741 B2
(45) Date of Patent: *Dec. 20, 2011

(54) SAVING AND FORWARDING CUSTOMIZED MESSAGES

(75) Inventors: Linda A. Roberts, Decatur, GA (US); Carl Bedingfield, Lilburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 544 days.

This patent is subject to a terminal disclaimer.

(21) Appl. No.: 12/207,293

(22) Filed: Sep. 9, 2008

(65) Prior Publication Data

US 2009/0067588 A1   Mar. 12, 2009

Related U.S. Application Data

(63) Continuation of application No. 11/441,561, filed on May 26, 2006, now Pat. No. 7,424,099, which is a continuation of application No. 10/178,276, filed on Jun. 24, 2002, now Pat. No. 7,072,452.

(51) Int. Cl.
*H04M 1/64* (2006.01)

(52) U.S. Cl. ........ 379/88.23; 340/7.31; 379/68; 379/87; 379/142.09; 379/210.01; 379/221.11; 455/413; 455/566

(58) Field of Classification Search ............... 340/7.31; 379/68, 87, 88.13, 88.17, 88.22, 88.23, 142.06, 379/220.01, 88.04, 142.09, 201.02, 210.01, 379/211.01, 211.02, 221.02, 221.11; 455/412, 455/413, 566

See application file for complete search history.

(56) References Cited

U.S. PATENT DOCUMENTS 4,310,727 A * 1/1982 Lawser ............... 379/211.02
5,479,491 A   12/1995 Garcia
(Continued)

FOREIGN PATENT DOCUMENTS

EP    1051018    11/2000

OTHER PUBLICATIONS

International Telecommunication Union, Series T: Terminals for Telematic Services, "Procedures for the transfer of facsimile data via store-and-forward on the Internet," Amendment 1: Full Mode, ITU-T Recommendation T.37—Amendment 1, Sep. 1999, 62 pages.

(Continued)

*Primary Examiner* — Gerald Gauthier
(74) *Attorney, Agent, or Firm* — Thomas, Kayden, Horstemeyer & Risley, LLP

(57) ABSTRACT

Methods and computer-readable media provide presenting a customized message to an incoming calling party and for allowing the calling party to save or forward the customized message. A called party desiring to leave a customized message for certain incoming calling parties submits a customized message to an intelligent network component of her telecommunications service provider along with identifiers for specified incoming callers who are to receive the customized message upon calling the called party. After the customized message is prepared, incoming callers who have been associated with the customized message are presented with the customized message before being connected to the called party. After an incoming caller receives the customized message, the calling party may store or send the customized message for later retrieval. If the incoming call is not from a telephone directory number associated with the customized message, the incoming call is processed according to normal call processing methods.

20 Claims, 4 Drawing Sheets

U.S. PATENT DOCUMENTS

| Patent No. | | Date | Name | Ref |
|---|---|---|---|---|
| 5,563,939 | A * | 10/1996 | La Porta et al. | 379/221.02 |
| 5,590,184 | A * | 12/1996 | London | 379/142.09 |
| 5,680,443 | A | 10/1997 | Kasday | |
| 5,742,905 | A | 4/1998 | Pepe | |
| 5,748,709 | A | 5/1998 | Sheerin | |
| 5,764,746 | A * | 6/1998 | Reichelt | 379/210.01 |
| 5,797,124 | A | 8/1998 | Walsh | |
| 5,884,262 | A | 3/1999 | Wise | |
| 5,892,814 | A | 4/1999 | Brisebois | |
| 5,963,626 | A | 10/1999 | Nabkel | |
| 6,049,697 | A * | 4/2000 | Scozzarella et al. | 340/7.31 |
| 6,049,796 | A | 4/2000 | Siitonen | |
| 6,052,438 | A * | 4/2000 | Wu et al. | 379/67.1 |
| 6,069,946 | A * | 5/2000 | Lieuwen | 379/211.01 |
| 6,078,650 | A | 6/2000 | Hansen | |
| 6,091,947 | A | 7/2000 | Sumner | |
| 6,097,941 | A | 8/2000 | Helferich | |
| 6,122,348 | A | 9/2000 | French | |
| 6,125,376 | A | 9/2000 | Klarlund | |
| 6,181,780 | B1 | 1/2001 | Finnigan | |
| 6,181,781 | B1 | 1/2001 | Porter | |
| 6,215,864 | B1 * | 4/2001 | Goyal et al. | 379/221.11 |
| 6,226,362 | B1 | 5/2001 | Gerszberg | |
| 6,233,318 | B1 | 5/2001 | Picard | |
| 6,285,984 | B1 | 9/2001 | Speicher | |
| 6,292,480 | B1 | 9/2001 | May | |
| 6,301,608 | B1 | 10/2001 | Rochkind | |
| 6,332,020 | B1 | 12/2001 | Mitchell | |
| 6,351,523 | B1 | 2/2002 | Detlef | |
| 6,368,205 | B1 | 4/2002 | Frank | |
| 6,374,223 | B1 | 4/2002 | Donaldson | |
| 6,446,114 | B1 | 9/2002 | Bulfer | |
| 6,459,774 | B1 | 10/2002 | Ball | |
| 6,459,785 | B1 | 10/2002 | Naumburger | |
| 6,487,277 | B2 | 11/2002 | Beyda | |
| 6,519,327 | B1 | 2/2003 | Cannon | |
| 6,522,879 | B2 | 2/2003 | Myer | |
| 6,529,586 | B1 | 3/2003 | Elvins | |
| 6,529,602 | B1 | 3/2003 | Walker | |
| 6,539,080 | B1 | 3/2003 | Bruce | |
| 6,621,892 | B1 | 9/2003 | Banister | |
| 6,665,532 | B1 | 12/2003 | Boland | |
| 6,683,940 | B2 | 1/2004 | Contractor | |
| 6,697,459 | B2 | 2/2004 | Finnigan | |
| 6,721,397 | B1 | 4/2004 | Lu | |
| 6,728,934 | B1 | 4/2004 | Scopes | |
| 6,744,867 | B1 | 6/2004 | Chin | |
| 6,792,093 | B2 | 9/2004 | Barak | |
| 6,795,530 | B1 | 9/2004 | Gilbert | |
| 6,801,763 | B2 | 10/2004 | Elsey | |
| 6,807,257 | B1 | 10/2004 | Kurganov | |
| 6,829,334 | B1 | 12/2004 | Zirngibl | |
| 6,850,609 | B1 | 2/2005 | Schrage | |
| 6,868,142 | B2 | 3/2005 | Gupta | |
| 6,888,930 | B1 * | 5/2005 | Hartselle et al. | 379/88.22 |
| 6,940,958 | B2 | 9/2005 | Clapper | |
| 6,987,841 | B1 | 1/2006 | Byers | |
| 6,996,212 | B1 | 2/2006 | Baker | |
| 7,046,772 | B1 | 5/2006 | Moore | |
| 7,050,792 | B2 | 5/2006 | Chou | |
| 7,072,452 | B1 * | 7/2006 | Roberts et al. | 379/88.23 |
| 7,088,810 | B1 * | 8/2006 | Burg | 379/201.02 |
| 7,099,453 | B2 * | 8/2006 | Crockett et al. | 379/220.01 |
| 7,190,950 | B1 | 3/2007 | Baker | |
| 7,221,742 | B1 | 5/2007 | Baker | |
| 7,286,653 | B2 | 10/2007 | Hartselle | |
| 7,317,908 | B1 * | 1/2008 | Eason | 455/413 |
| 7,359,491 | B2 * | 4/2008 | Liu et al. | 379/68 |
| 7,424,099 | B2 * | 9/2008 | Roberts et al. | 379/88.23 |
| 2001/0027097 | A1 | 10/2001 | I'Anson | |
| 2001/0041590 | A1 | 11/2001 | Silberfenig | |
| 2001/0053206 | A1 | 12/2001 | Muller | |
| 2002/0001369 | A1 | 1/2002 | Merwin | |
| 2002/0031207 | A1 | 3/2002 | Lin | |
| 2002/0069060 | A1 | 6/2002 | Cannavo | |
| 2002/0077082 | A1 | 6/2002 | Cruickshank | |
| 2002/0131566 | A1 | 9/2002 | Stark | |
| 2002/0143885 | A1 | 10/2002 | Ross | |
| 2002/0147592 | A1 | 10/2002 | Wilmot | |
| 2002/0159572 | A1 | 10/2002 | Fostick | |
| 2003/0012346 | A1 | 1/2003 | Langhart | |
| 2003/0018720 | A1 | 1/2003 | Chang | |
| 2003/0039342 | A1 | 2/2003 | Yafuso | |
| 2003/0078035 | A1 | 4/2003 | Sheha | |
| 2003/0119486 | A1 | 6/2003 | Tari | |
| 2003/0135647 | A1 | 7/2003 | Himmel | |
| 2003/0140090 | A1 | 7/2003 | Rezvani | |
| 2003/0140091 | A1 | 7/2003 | Himmel | |
| 2003/0142799 | A1 | 7/2003 | Candell | |
| 2003/0169330 | A1 | 9/2003 | Ben-Shachar | |
| 2005/0136896 | A1 | 6/2005 | Ward | |
| 2006/0083360 | A1 | 4/2006 | Moore | |
| 2006/0083365 | A1 | 4/2006 | Baker | |
| 2006/0171511 | A1 | 8/2006 | Liu | |
| 2006/0233327 | A1 * | 10/2006 | Roberts et al. | 379/88.23 |
| 2007/0223661 | A1 | 9/2007 | Baker | |
| 2007/0243904 | A1 * | 10/2007 | Chin et al. | 455/566 |
| 2009/0067588 | A1 * | 3/2009 | Roberts et al. | 379/87 |

OTHER PUBLICATIONS

International Telecommunication Union, Series T: Terminals for Telematic Services, "Procedures for the transfer of facsimile data via store-and-forward on the Internet," Amendment 2, ITU-T Recommendation T.37— Amendment 2, Mar. 2001, 5 pages.

International Telecommunication Union, Series T: Terminals for Telematic Services, "Procedures for the transfer of facsimile data via store-and-forward on the Internet," Amendment 3, ITU-T Recommendation T.37 (1998)—Amendment 3, Nov. 2002, 5 pages.

International Telecommunication Union, Series T: Terminals for Telematic Services, "Procedures for the transfer of facsimile data via store-and-forward on the Internet," ITU-T Recommendation T.37, Jun. 1998, 13 pages.

Roberts; U.S. Appl. No. 11/441,561, filed May 26, 2006.

Roberts; U.S. Appl. No. 10/178,276, filed Jun. 24, 2002.

Roberts; Final Rejection mailed Jun. 27, 2007 for U.S. Appl. No. 11/441,561, filed May 26, 2006.

Roberts; Non-Final Rejection mailed Jan. 24, 2007 for U.S. Appl. No. 11/441,561, filed May 26, 2006.

Roberts; Notice of Allowance and Fees Due mailed Apr. 2, 2008 for U.S. Appl. No. 11/441,561, filed May 26, 2006.

Roberts; Notice of allowance and Fees Due mailed Nov. 15, 2007 for U.S. Appl. No. 11/441,561, filed May 26, 2006.

Roberts; Final Rejection mailed May 18, 2005 for U.S. Appl. No. 10/178,276, filed Jun. 24, 2002.

Roberts; Non-Final Rejection mailed Aug. 25, 2005 for U.S. Appl. No. 10/178,276, filed Jun. 24, 2002.

Roberts; Non-Final Rejection mailed Oct. 1, 2004 for U.S. Appl. No. 10/178,276, filed Jun. 24, 2002.

Roberts; Notice of Allowance and Fees Due mailed Mar. 2, 2006 for U.S. Appl. No. 10/178,276, filed Jun. 24, 2002.

* cited by examiner

SAVING AND FORWARDING CUSTOMIZED MESSAGES

CROSS REFERENCE TO RELATED APPLICATION

This application is a continuation of U.S. patent application Ser. No. 11/441,561, filed May 26, 2006 and issued as U.S. Pat. No. 7,424,099, which is a continuation of U.S. patent application Ser. No. 10/178,276, filed Jun. 24, 2002 and issued as U.S. Pat. No. 7,072,452, which are incorporated herein by reference.

FIELD OF THE INVENTION

This invention relates to a method and system for allowing a calling party to receive, save and forward customized messages from a called party.

BACKGROUND OF THE INVENTION

In the modern telecommunications environment, people have grown accustomed to sending and receiving a variety of messages including both voice and electronic mail messages. Often an individual would like to prepare a customized message that will be received by incoming telephone callers to alert the callers of some action or event. For example, a party may desire to provide driving directions to the party's home for an upcoming social event. It is undesirable to leave a general voicemail message on the party's local voicemail machine or on a network-based voicemail system that is received by all incoming callers. Also, even if such a method is used, the called party may answer some or all incoming calls only to have to convey the message to the incoming callers. If the called party ignores all incoming calls, the called party may miss important calls unrelated to the social event.

From the calling party's perspective, it is undesirable to receive a customized message if the message is not relevant to the calling party. If the calling party is interested in the subject matter of the customized message, often the calling party desires to save the message, but does not have access to a pen, paper, or other medium for saving information conveyed by the message.

It is with respect to these and other considerations that the present invention has been made.

SUMMARY OF THE INVENTION

In accordance with the present invention, the above and other problems are solved by a method and system for presenting a customized message to an incoming calling party and for allowing the calling party to save or forward the customized message. A called party desiring to leave a customized message for certain incoming calling parties submits a customized message to an intelligent network component of her telecommunications service provider along with telephone directory numbers for specified incoming callers who are to receive the customized message upon calling the called party. After the customized message is prepared, incoming callers whose telephone directory numbers have been associated with the customized message are presented with the customized message before being connected to the called party. After an incoming caller receives the customized message, the calling party may listen to the message again, save a copy of the message according to a variety of methods, and/or the calling party may be connected to the called party. If the incoming call is not from a telephone directory number associated with the customized message, the incoming call is processed according to normal call processing methods. That is, the incoming call may be answered by the called party, or the incoming call may be connected to the called party's voicemail system if the called party does not respond.

More particularly, a method and system are provided for presenting a customized message to a calling party and for allowing the calling party to save or forward the customized message that includes saving a customized message for presentation to the calling party and associating the customized message with a telephone directory number of the calling party. When a call is received from the calling party directed to a called party, a determination is made as to whether the call from the calling party is associated with the customized message. If the call from the calling party is associated with the customized message, the customized message is played to the calling party, and the customized message is saved to a server or other location designated by the calling party for later retrieval by the calling party. A determination is made as to whether the call from the calling party should be connected to the called party after saving the customized message to the location designated by the calling party. If the call from the calling party is not to be connected to the called party after playing the customized message to the calling party, the call attempt to connect the call from the calling party to the called party is terminated. If the call from the calling party is not to be connected to the called party after saving the customized message to a location designated by the calling party, the attempt to connect the call from the calling party to the called party is terminated.

Saving a customized message for presentation to the calling party may include saving the customized message at a voicemail system within a telecommunications network as a voice message or as a text message, or the customized message may be saved as a text message via an Internet-based Web page. Determining whether the customized message is to be saved for later retrieval by the calling party includes requesting saving instructions from the calling party. The customized message may be saved to a location designated by the calling party including a calling party voicemail box of the voicemail system. The customized message may be saved to a location designated by the calling party by mailing electronically the customized message to an electronic mailbox address designated by the calling party. The customized message may be forwarded to a forwarding telephone directory number received from the calling party.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a method and system for presenting a customized message to an incoming calling party and for allowing the calling party to save or forward the customized message.

Exemplary Operating Environment

Figure 1:
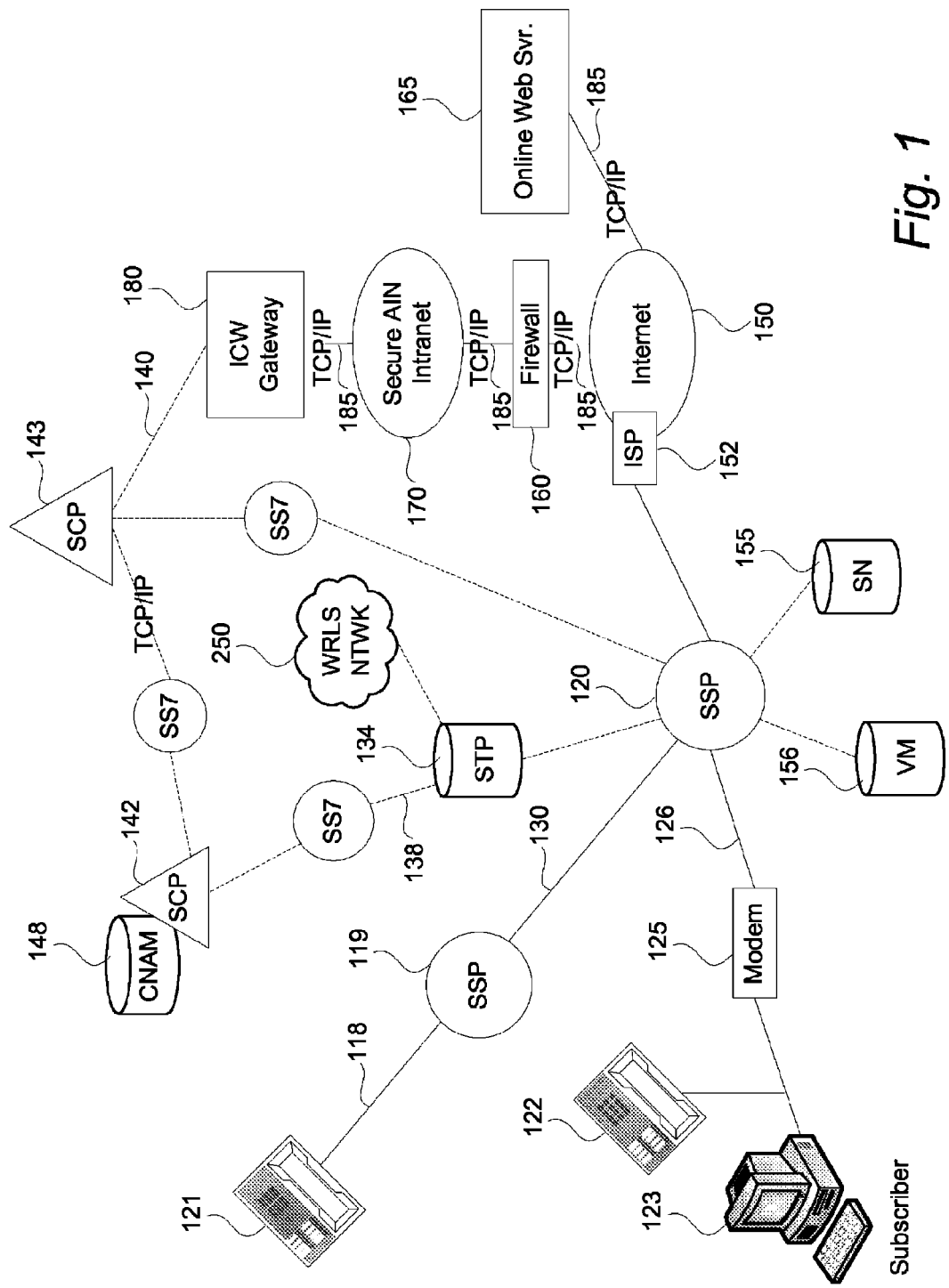
FIGS. 1 and 2 are block diagrams illustrating components of a wireline and wireless telecommunications network that provides an operating environment for the present invention.

It is advantageous to describe an exemplary operating environment in which the current invention may reside. FIG. 1 is a block diagram illustrating components of a telephone network that provides an exemplary operating environment for the present invention. The public switched telephone network that evolved in the 1980s incorporated the advanced intelligent network (AIN). Some of the components of the advanced intelligent network are illustrated in FIG. 1. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 1, each central office may include an electronic switch known to those skilled in the art as a service switching point (SSP). These are indicated in FIG. 1 as SSP switches 119 and 120. The terms "SSP" and "switch" are used interchangeably hereinafter and are understood to refer to a telecommunications switch having AIN capability and which may be utilized for connecting voice channel circuits, including voice channel lines, such as the trunk circuit 130.

As shown in FIG. 1, central offices switches (SSP) 119 and 120 have a plurality of subscriber lines 118 and 126 connected thereto. Each of the subscriber lines 118 and 126 is connected to a terminating piece or pieces of customer premises equipment that are represented by telephones 121 and 122 and computer 123. SSP switches 119 and 120 are connected by a trunk circuit 130. These are the voice path trunks that interconnect the central offices 119 and 120 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number.

Much of the intelligence, and the basis for many of the enhanced features of the network, resides in local service control points (SCP) 142, 143. As is known to those skilled in the art, service control points, such as SCP 143, are physically implemented by relatively powerful reliable computers. Among the functions performed by the service control points are access to and management of network databases used in providing enhanced services.

The SCP 142 is also connected to a caller name (CNAM) database 148. The CNAM database comprises a plurality of directory numbers along with associated names for the directory numbers. The CNAM database may be used to provide a look-up database to provide caller identification (ID) service. The CNAM database may be comprised of directory numbers from wireline customers as well as wireless customers of a wireless network.

The modern Advanced Intelligent Network also includes services nodes (SN) such as services node 155. Those skilled in the art are familiar with services nodes, which are physically implemented by the same types of computers that embody the SCP 142. In addition to the computing capability and data base maintenance features, services nodes 155 use ISDN lines and may include DTMF signal recognition devices, tone generation devices, text-to-speech (TTS) voice synthesis devices and other voice or data resources. According to an embodiment of the present invention the services node 155 may include a computer or collection of computers, recording and recording playback devices, and software for recording announcements for incoming calls, recording and playing back recorded messages, and for receiving incoming calls and for making outgoing calls at the direction of the network. In addition to the recording and playback functionality, the services node may include software for conversion of analog voice messages to digitized forms such as WAV files and MP3 files. The services node may have memory capacity for saving announcements for provision to callers. The computing system of the services node 156 may send and receive electronic mail via the network and the Internet 150.

The voicemail system 156 is shown in FIG. 1 being functionally connected to the switch 120. Calls are routed to and from the voicemail system 156 at the control and direction of the network, illustrated in FIG. 1, via such components as the SCP 142. Subscribers to voicemail services may have calls forwarded to the voicemail system 156 where voice messages may be left to the subscriber when the subscriber's line is busy or unanswered. According to an alternate embodiment, the voicemail system 156 may include all the functionality of the services node 155, described above, so that functionality of the present invention provided by the services node 155 may alternatively be provided by the voicemail system 156.

The Internet 150 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 150 and the TCP/IP transmission protocols is well known to those skilled in the art.

The Firewall 160 is preferably a combination of hardware and software that prevents or limits exposure of computers or network computers to unauthorized access or attack from outside the protected computer or network of computers. The Firewall 160 prevents or limits unauthorized access to the data, files, messages, and the like, of subscribers to the services of the telecommunications provider.

The secure AIN Intranet 170 preferably is a distributed telecommunications and computing network for providing services in accordance with the present invention. The Gateway 180 provides access to the secure AIN Intranet 170 by the other components of the telecommunications network illustrated in FIG. 1. As is well known to those skilled in the art, a gateway may provide a number of functions including connectivity between incompatible communications networks.

Figure 2:
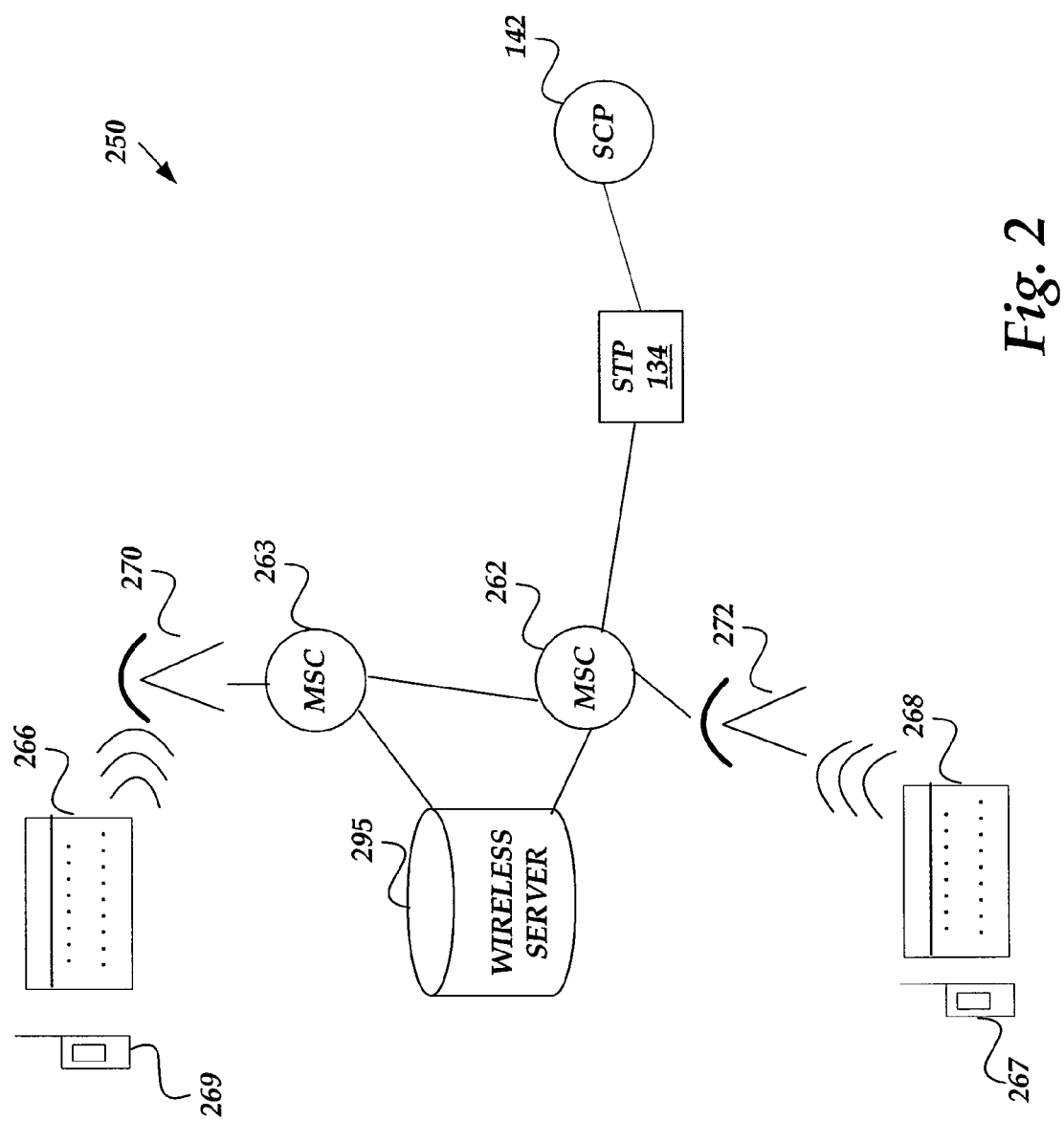
Figure 3:
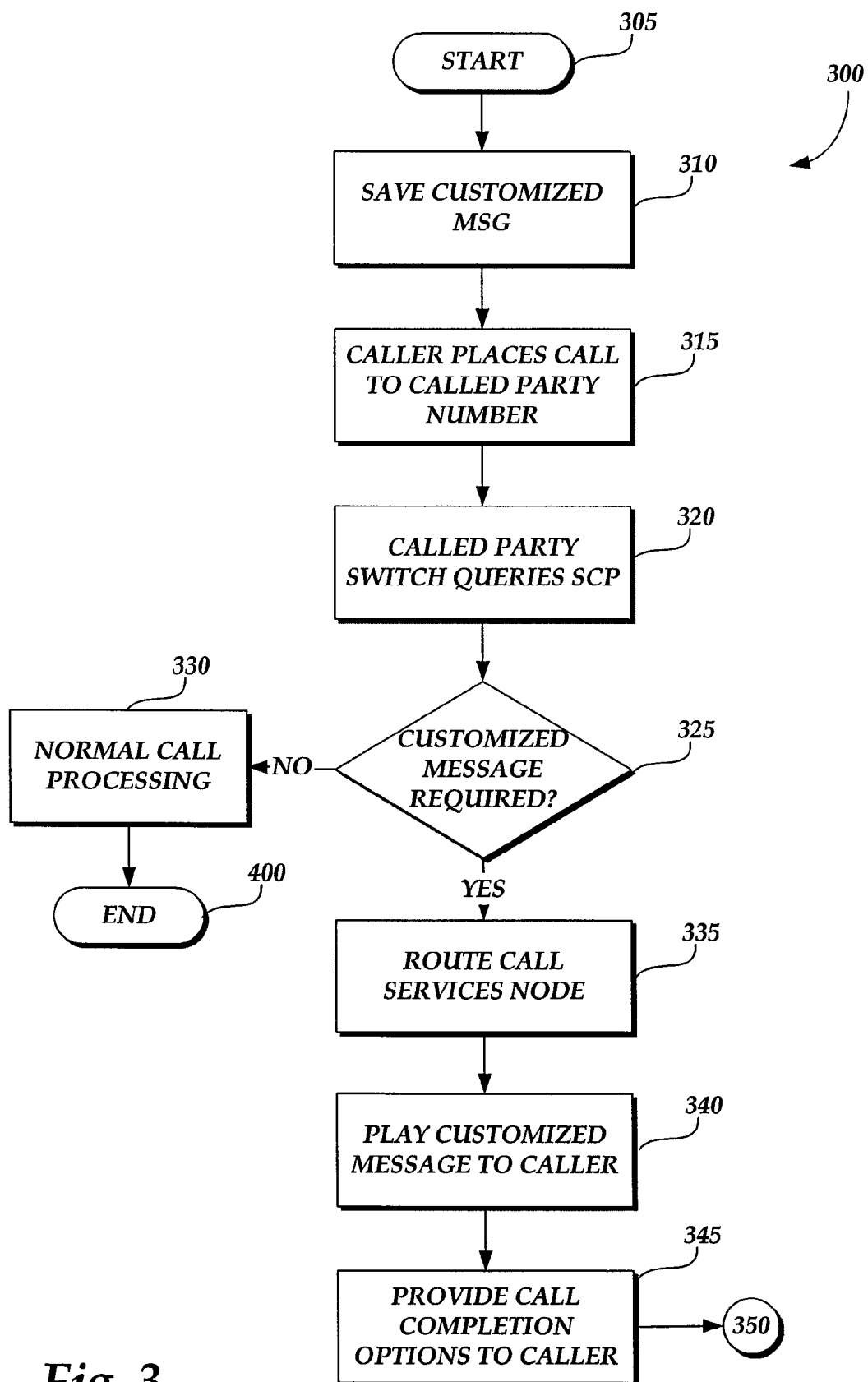
FIGS. 3 and 4 illustrate a logical flow of the steps performed by a method and system of the present invention for presenting a customized message to an incoming calling party and for allowing the calling party to save or forward the customized message.

Components of a wireless telecommunications network 250, such as a cellular network, are illustrated in FIG. 2. The wireless network components include mobile switching centers (MSC) 262, 263. The MSC 262, 263 are switches providing services and coordination between wireless users in the wireless network and external wireline and wireless networks. The MSC 262 may be connected to a signal transfer point (STP) 134 to provide information to the wireline network and receive information from the wireline network. The MSC 262, 263 communicates with wireless subscribers, such as wireless interactive pagers 266 and 268 via wireless antennas 170, 272. As should be understood by those skilled in the art, the wireless interactive devices 266, 268 may include any suitable wireless transceiver for sending and receiving wireless messages, such as wireless telephones 267, 269, wireless personal digital assistants and the like.

The wireless server 295 is a computer or collection of computers for handling a variety of call processing features provided for the wireless components of the wireless telecommunication network. In accordance with the present invention, the wireless server 295 contains software functionality for receiving and implementing instructions for forwarding wireless messages to wireless devices 266, 268, 267, 269.

Operation

Having described an operating environment for the present invention with reference to FIGS. 1 and 2, the following is a description of a logical flow of the steps performed by a method and system of the present invention for presenting a customized message for an incoming calling party and for allowing the calling party to save or forward the customized message. The method 300 begins at start step 305 and proceeds to step 310 where the called party creates and stores a customized message for certain callers based on the callers' telephone directory numbers. For example, as described above, the called party may wish to provide a customized message including driving directions to the called party's home for a social event that will only be received by incoming callers who have been invited to the social event.

According to an embodiment of the present invention, the called party may create and store the customized message in association with the specific caller's telephone directory numbers according to a variety of methods. First, the called party may log on to the Internet 150 via her computer 123 to a Web-based customized message service operated at the on-line Web server 165, illustrated in FIG. 1. Using the customized message Web site, the called party may type a text message, for example driving directions to the called party's home, and then the calling party may enter the telephone directory numbers of all calling parties who the called party wishes to receive the customized message. Once the called party submits the information via the Internet-based Web site, the data associated with the customized message and associated telephone directory numbers is passed through the Internet gateway 180, illustrated in FIG. 1, and on to the service control point 143 where the data is saved for future call processing in accordance with the present invention. Likewise, the called party may enter a text-based customized message and associated telephone directories from a wireless personal digital assistant such as the wireless personal digital assistants 266 and 268 or from the wireless telephones 267 and 269, illustrated in FIG. 2.

Alternatively, the called party may save the customized message as a voice message using conventional telecommunications components such as the services node 155. According to this embodiment, the calling party may dial into a customized message service provided by her telecommunications service provider using her telephone 122 by dialing a function code, such as a star code. For example, the called party may dial a star code, such as "*26," that will cause a trigger to be fired at the SSP 120 to present a query to the service control point 143 to determine what specialized service the called party desires. In this case, the query to the SCP 143 results in a determination based on the star code entered by the called party that the called party desires to leave a voice-based customized message and associated telephone directory numbers. In response to the query, the service control point 143 causes the services node 155 to play a voice-based prompt to the called party requesting a voice version of the customized message, for example, "my house is the third house on the left." Following receipt of the voice-based customized message, the services node 155 may prompt the called party to enter all telephone directory numbers that are associated with the customized message. The called party may likewise save the customized message as a voice message at the voicemail system 156. For additional description of the creation and utilization of customized messages, see United States Patent Application entitled, "Web-Based Messaging System with Personalized Caller-Specific Messages," filed Dec. 29, 2000, and assigned Ser. No. 09/753,234, which is incorporated herein by reference as if fully set out herein.

Once the customized message is created by the called party as described with reference to step 310, the customized message whether voice or text-based is available for presentation to calling parties. At step 315, a calling party places a call to the called party from the telephone set 121 directed to the called party's telephone set 122. Likewise, the calling party may place a telephone call from the wireless telephone 267 via the MSC 262, as illustrated in FIG. 2. At step 320, the telephone call placed by the calling party is directed to the switch 120 of the called party. At the called party switch 120, a termination attempt trigger provisioned on the called party's telephone line 126 is fired to generate a query to the SCP 143 to determine whether the incoming call directed to the called party's telephone directory number requires special processing.

At step 325, in response to the query directed to the SCP 143, the SCP does a database lookup to determine whether the telephone directory number of the calling party is associated with a customized message that should be played to the calling party. If at step 325 the determination is made that the calling party telephone directory number is not associated with a customized message saved by the called party, the method proceeds to step 330, and the call is processed according to normal call processing. That is, at step 330 the calling party's telephone call is connected to the called party at which point the telephone call may be answered, not answered, forwarded to a separate telephone directory number, or directed to a voicemail system of the called party.

If at step 325 a determination is made at the SCP 143 that the telephone directory number of the calling party is associated with a customized message, the method proceeds to step 335, and the call is routed to the services node 155 for presentation of the customized message to the calling party. At step 340, if the called party originally saved the customized message in voice format, the call is routed to the services node, where the voice-formatted customized message is played to the calling party. Alternatively, if the customized message was saved in a text format, as described above, a text-to-speech synthesizer resident at the services node 155 converts the text-based message to a speech-based message that is played to the calling party. After the customized message is played to the calling party at step 340, the method proceeds to step 345 and call completion options are provided to the calling party.

Figure 4:
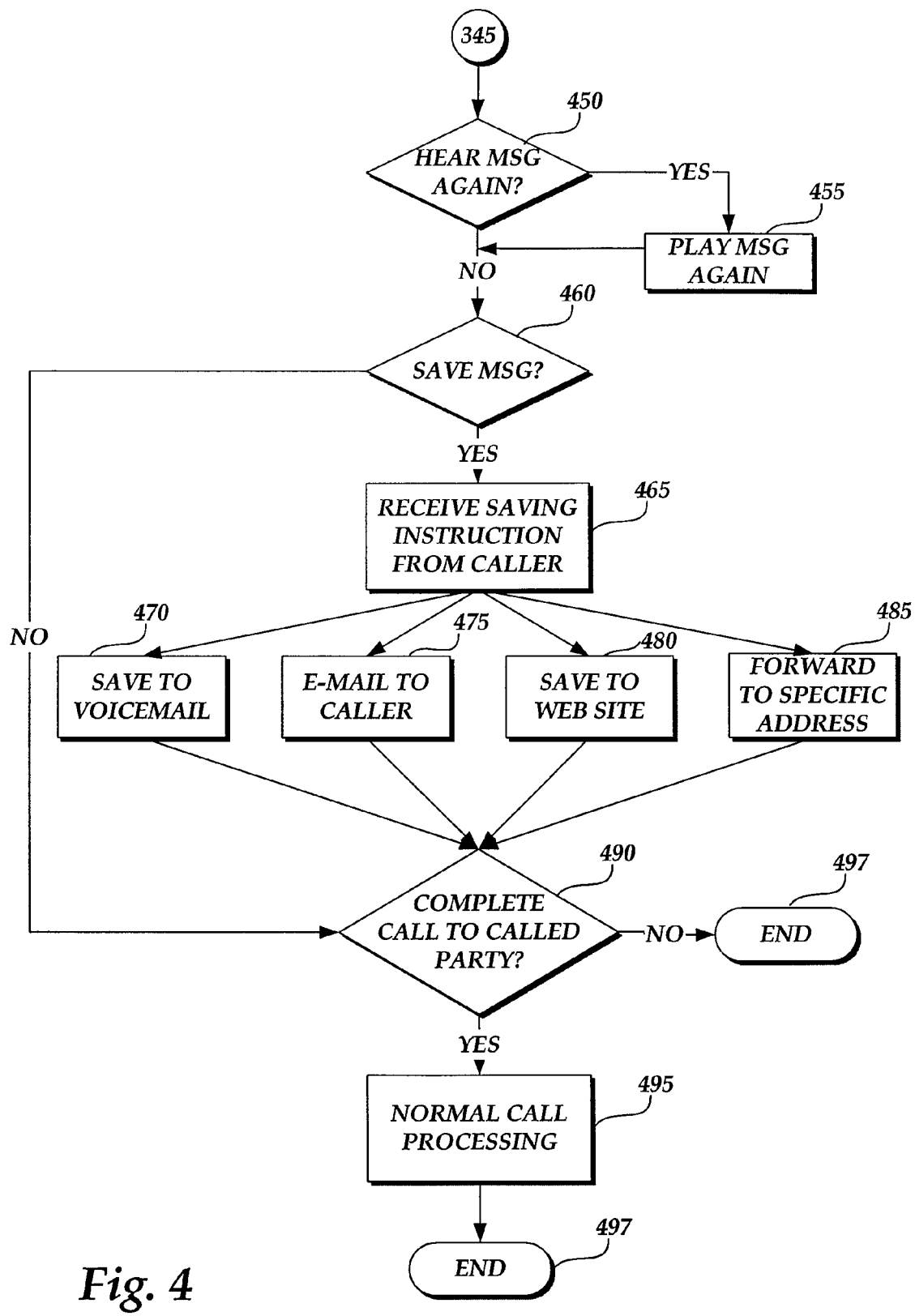

Referring now to FIG. 4, at step 450, the first option provided to the calling party allows the calling party to hear the message again. For example, the services node 155 may provide an audible prompt such as "press 1 to hear the message again." If at step 450 a determination is made that the calling party would like to hear the message again, the method proceeds to step 455 and the services node 155 plays the customized message to the calling party a second time. If not, the method proceeds to step 460 and the calling party is given the option of saving the customized message to a server or other location designated by the calling party. For example, the services node may present a prompt such as "press 2 to save the customized message."

If the calling party does not wish to save the customized message, the method proceeds to step 490, and the calling party is given the option of completing the call to the called party. That is, it should be understood, that until this point, all call processing according to the present invention has occurred prior to actual call set-up between the calling party and the called party. The customized message is played to the calling party prior to any attempt to actually connect the calling party to the called party. As should be understood, if the customized message provided to the calling party answers any question or provides all information the calling party had for the called party, the calling party may not wish to actually connect to the called party. At step 490, the calling party may be presented with a prompt such as "press 3 to complete the call to the called party." If at step 490 the calling party does not select the option to complete the call, the method ends at step 497, and the call attempt is terminated. If at step 490 the calling party desires to have the call completed to the called party, the method proceeds to step 495, and the call is completed to the called party according to normal call processing, as described above.

Referring back to step 460, if the calling party desires to save the customized message to a location designated by the calling party, the method proceeds to step 465, and the services node 155 presents the calling party with a prompt such as "to save the message to your voicemail, press 1; to save the message to your e-mail address, press 2; to save the message to the customized messaging service Web site, press 3; to forward the message to a different telephone directory number, press 4."

If the calling party decides to save the customized message to her voicemail, the method proceeds to step 470. If the telecommunications service provider under which the present call is being processed and under which the customized messaging service of the present invention is operated recognizes the caller's telephone directory number at the initial lookup at the service control point 143 as a telephone directory number associated with a subscriber to a network-based voicemail system for the same telecommunications service provider, then the voicemail system 156 that presently maintains control of the customized message routes the customized message directly to the voicemail box of the calling party and saves the message in the calling party's voicemail box.

Alternatively, if the telecommunications service provider does not recognize the calling party's telephone directory number as a subscriber to the voicemail system of that service provider, for example, the calling party is calling from outside the telecommunication service provider's network, the service control point may send the customized message back to the caller. That is, because the service control point has the calling party's telephone directory number in order to associate the calling party with the customized message, the service control point may cause the voicemail system 156 to route the customized message back to the calling party at the calling party's telephone directory number. The voicemail system 156 places a call to the telephone directory number of the calling party while the calling party is presently engaged with the voicemail system according to the present invention and deposits the customized message at the calling party's home network-based or local voicemail system. Alternatively, the service control point may cause the services node 155 to route the customized message back to the calling party at the calling party's telephone directory number.

Alternatively, the voicemail message may be sent to the calling party's voicemail system via an Internet-based voicemail transfer system. The voicemail system 156 may convert the speech-formatted customized message into a well-known digitized form such as WAV or MP3. The digitized version of the customized message may then be sent via the Internet 150, gateway 180 and service control point 143 to a separate telecommunications service provider or to the voicemail system of the same service provider of the Internet as opposed to normal telecommunications data links such as the SS7 data links illustrated in FIG. 1. Alternatively, the digitized formatted customized message may be sent by the same process to an electronic mail site of the calling party, as will be described below with reference to step 475. Once the voicemail system of the calling party receives the digitized formatted customized message, that message may be stored in the voicemail box of the calling party, as described above.

If at step 465 the calling party selects the option to have the customized message sent to her e-mail address, the method proceeds to step 475. As with the previous option, if the telecommunications service provider under which the present invention is operating knows the electronic mail address of the calling party, for example, the calling party is a customer of this telecommunications service provider and the electronic mail address is kept as a part of a customer profile that is obtained by the service control point 143 as part of the original lookup to determine that the calling party telephone directory number is associated with the customized message, then the customized message may be forwarded to the calling party's electronic mail address at the calling party's computer 123.

If the customized message was originally entered via text, then the text message may be electronically mailed from the services node 155 via the service control point 143, the gateway 180, the Internet 150 and to the calling party at the calling party's computer 123. If the original customized message was entered as a voice message, the services node 155 converts the voice message to a digitized format such as a WAV file or MP3. The digitized voicemail message is then sent as an attachment to an electronic mail message to the calling part the at the calling party's computer 123, as described above for sending a text message to the calling party. If the customized message is electronically mailed to a wireless personal digital assistant such as the personal digital assistants 266, 268 or the wireless telephones 267, 269, illustrated in FIG. 2, then the message is forwarded from the Internet through the signal transfer point 134 to the wireless server 295 where the message is properly formatted for receipt by the personal digital assistants or wireless telephones. The options for saving the message offered to the calling party may be limited by the type of device known to be used by the calling party. For example, if it is known that the calling party utilizes an interactive paging device that does not support audio files, then the option of forwarding an audio file to that device is not offered.

If at step 465 the calling party selects the option to save the customized message to a customized message service Internet-based Web site, the method proceeds to step 480. At step 480, the services node 155 forwards the text version of the customized message through the gateway 180, Internet 150, the on-line Web server 165, and to a customized message service Web site maintained on the on-line Web server 165. As described above, if the original customized message was saved as a voice message, the services node 155 converts the voice message to a digital format such as WAV or MP3 and forwards the digital formatted message to the customized message service Web site. Later, when the caller desires to retrieve the saved message, the caller logs on to the customized service Web site from the caller's computer 123 via the Internet 150. The caller enters a passcode, for example the caller's telephone directory number that has been associated with the customized message by the called party, and the calling party may download a copy of the saved text message or download and listen to a copy of the digital formatted voice message.

If at step 465 the calling party selected the option to forward the customized message to a separate telephone directory number, the method proceeds to step 485. It is advantageous to allow the calling party to forward the customized message to a forwarding telephone directory number where the calling party may wish to save the message on a voicemail system associated with that telephone directory number or where the calling party desires to forward the information contained in the customized message to a third person who may be reached at the forwarding number. At step 485, the services node 155 may provide the calling party with a prompt such as "using your telephone keypad please enter a forwarding telephone directory number after the tone." After the forwarding telephone directory number is entered by the calling party, the services node, or alternatively the voicemail system, places a call under the control of the service control point 143 through the switch 120 to the forwarding telephone directory number provided by the calling party. If the call directed to the forwarding telephone directory number is answered by either a voicemail system or by a called party at that number, the voice version of the customized message or the text-to-speech formatted version of the customized message may be played to the called party at the forwarding telephone directory or may be stored in the voicemail system associated with the forwarding telephone directory number. If desired, a preformatted message may be included before the playing of the customized message such as "the following is a forwarded customized message."

After disposition of the customized messages as described above with reference to steps 470, 475, 480, 485, the method proceeds to step 490 and a determination is made as to whether the caller desires to have the call completed to the originally called party, as described above. If yes, the method proceeds to step 495, and the call is completed to the called party according to normal call processing, and the method ends at step 497. If the calling party does not wish to have the call completed to the called party, the method proceeds directly to step 497 and ends.

As described, a method and system are provided for presenting a customized message to an incoming calling party and for allowing the calling party to save or forward the customized message. According to an alternate embodiment, the functions performed by the services node 155, as described above, may be performed by the voicemail system 156 where the voicemail system is equipped with similar functionality as the services node 155, as described with reference to FIG. 1. It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method of presenting a customized message to a calling party and for allowing the calling party to save the customized message, comprising:
   saving the customized message from a called party for presentation to the calling party;
   associating the customized message with an identifier of the calling party;
   receiving a call from the calling party directed to the called party;
   determining whether the call from the calling party is associated with the customized message;
   if the call from the calling party is associated with the customized message, playing the customized message from the called party to the calling party;
   after playing the customized message to the calling party, receiving an indication from the calling party to save the customized message from the called party to a location designated by the calling party for later retrieval by the calling party; and
   saving the customized message to the location designated by the calling party for later retrieval by the calling party, wherein if the call from the calling party is not associated with the customized message, the call is routed to the called party.

2. The method of claim 1, wherein saving the customized message for presentation to the calling party includes saving the customized message as a voice message.

3. The method of claim 1, wherein saving a customized message for presentation to the calling party includes saving the customized message as a text message.

4. The method of claim 3, wherein saving the customized message as a text message includes saving the text message via an Internet-based Web page.

5. The method of claim 4, further comprising:
   forwarding the text message to a services node within a telecommunications network; and
   at the services node, converting the text message to speech format.

6. The method of claim 1, wherein determining whether the call from the calling party is associated with the customized message comprises determining whether an identifier of the calling party is associated with the customized message.

7. The method of claim 1, further comprising:
   determining whether the call from the calling party is to be connected to the called party after playing the customized message to the called party; and
   if the call from the calling party is to be connected to the called party, attempting to connect the call from the calling party to the called party.

8. The method of claim 1, wherein saving the customized message to a location designated by the calling party includes mailing electronically the customized message to an electronic mailbox address designated by the calling party.

9. The method of claim 8, wherein mailing electronically the customized message to an electronic mailbox address of the calling party includes mailing electronically a text version of the customized message.

10. The method of claim 8, wherein mailing electronically the customized message to an electronic mailbox address of the calling party includes mailing a digitized voice file version of the customized message.

11. The method of claim 1, wherein saving the customized message to a location designated by the calling party includes:
    forwarding the customized message to a forwarding identifier.

12. The method of claim 11, further comprising:
prior to forwarding the customized message to a forwarding identifier, receiving the identifier from the calling party.

13. A method of presenting a customized message to a calling party and for allowing the calling party to electronically send the customized message, comprising:
saving the customized message from a called party for presentation to the calling party;
associating the customized message with an identifier of the calling party;
receiving a call from the calling party directed to the called party;
determining whether the call from the calling party is associated with the customized message using the identifier of the calling party;
if the call from the calling party is associated with the customized message, playing the customized message to the calling party;
after playing the customized message to the calling party, receiving an indication from the calling party to electronically send the customized message to a location designated by the calling party; and
sending the customized message to the location designated by the calling party,
wherein if the call from the calling party is not associated with the customized message, the call is routed to the called party.

14. The method of claim 13, wherein sending the customized message to the location designated by the calling party comprises sending a text version of the customized message in an electronic mail message.

15. The method of claim 13, wherein sending the customized message to the location designated by the calling party comprises sending a digital voice file version of the customized message in an electronic mail message.

16. The method of claim 13, wherein the location designated by the calling party comprises a wireless device.

17. The method of claim 13, wherein the location designated by the calling party comprises an electronic email account.

18. A computer-readable medium storing computer-executable instructions, the instructions including:
saving a customized message from a called party;
associating the customized message with an identifier of a calling party;
receiving a call from the calling party directed to the called party;
determining whether the call from the calling party is associated with the customized message; and
if the call from the calling party is associated with the customized message:
presenting the customized message to the calling party;
receiving an indication from the calling party to store the customized message at a location designated by the calling party; and
storing the customized message at the location designated by the calling party,
wherein if the call from the calling party is not associated with the customized message, the call is routed to the called party.

19. The computer-readable medium of claim 18, wherein the instructions further include:
receiving an indication from the calling party to store the customized message at an electronic address designated by the calling party; and
storing the customized message at the electronic address designated by the calling party.

20. The computer-readable medium of claim 18, wherein the instructions further include:
receiving an indication from the calling party to store the customized message at a forwarding telephone directory number designated by the calling party; and
storing the customized message at the forwarding telephone directory number designated by the calling party.

* * * * *